United States Patent
Levey et al.

(10) Patent No.: US 9,169,717 B2
(45) Date of Patent: Oct. 27, 2015

(54) HIGH UPTAKE SULFUR SOLVENT SYSTEMS AND METHODS FOR MAKING AND USING SAME

(71) Applicant: WEATHERFORD/LAMB, INC., Houston, TX (US)

(72) Inventors: Simon Levey, Edmonton (CA); Clayton Smith, Edmonton (CA); Pulikesi Murugan, Edmonton (CA)

(73) Assignee: LUBRIZOL OILFIELD SOLUTIONS INC., Wicklifte, OH (US)

( * ) Notice: Subject to any disclaimer, the term of this patent is extended or adjusted under 35 U.S.C. 154(b) by 301 days.

(21) Appl. No.: 13/669,787

(22) Filed: Nov. 6, 2012

(65) Prior Publication Data

US 2014/0128308 A1    May 8, 2014

(51) Int. Cl.
| | |
|---|---|
| B01D 53/56 | (2006.01) |
| A62D 3/00 | (2007.01) |
| A62D 3/30 | (2007.01) |
| C02F 1/24 | (2006.01) |
| C08G 71/02 | (2006.01) |
| E21B 37/06 | (2006.01) |
| C08G 12/06 | (2006.01) |
| C11D 7/32 | (2006.01) |
| C11D 11/00 | (2006.01) |

(52) U.S. Cl.
CPC ............... *E21B 37/06* (2013.01); *C08G 12/06* (2013.01); *C11D 7/3209* (2013.01); *C11D 11/0041* (2013.01)

(58) Field of Classification Search
CPC ........... B01D 53/56; A62D 3/00; A62D 3/30; C02F 1/24; C08G 71/02
See application file for complete search history.

(56) References Cited

U.S. PATENT DOCUMENTS

| | | | |
|---|---|---|---|
| 5,314,672 A * | 5/1994 | Vasil | 423/228 |
| 5,488,103 A | 1/1996 | Gatlin | |
| 2007/0032693 A1* | 2/2007 | Gatlin et al. | 588/313 |
| 2008/0029460 A1* | 2/2008 | Wright et al. | 210/705 |
| 2014/0301921 A1* | 10/2014 | Wright et al. | 423/118.1 |

FOREIGN PATENT DOCUMENTS

EP        0636675 A2    2/1995

OTHER PUBLICATIONS

PCT ISR and Written Opinion.

* cited by examiner

*Primary Examiner* — Charles Boyer
(74) *Attorney, Agent, or Firm* — Robert W Strozier

(57) ABSTRACT

Compositions for chemically removing sulfur deposits from reservoir formations, production tubing, flow lines, and other production equipment due to the production of sour gas and/or oil including reaction products of diamines and aldehydes at a mole ratio between about 1:1 and about 1:6, and methods for making and using same.

27 Claims, 14 Drawing Sheets

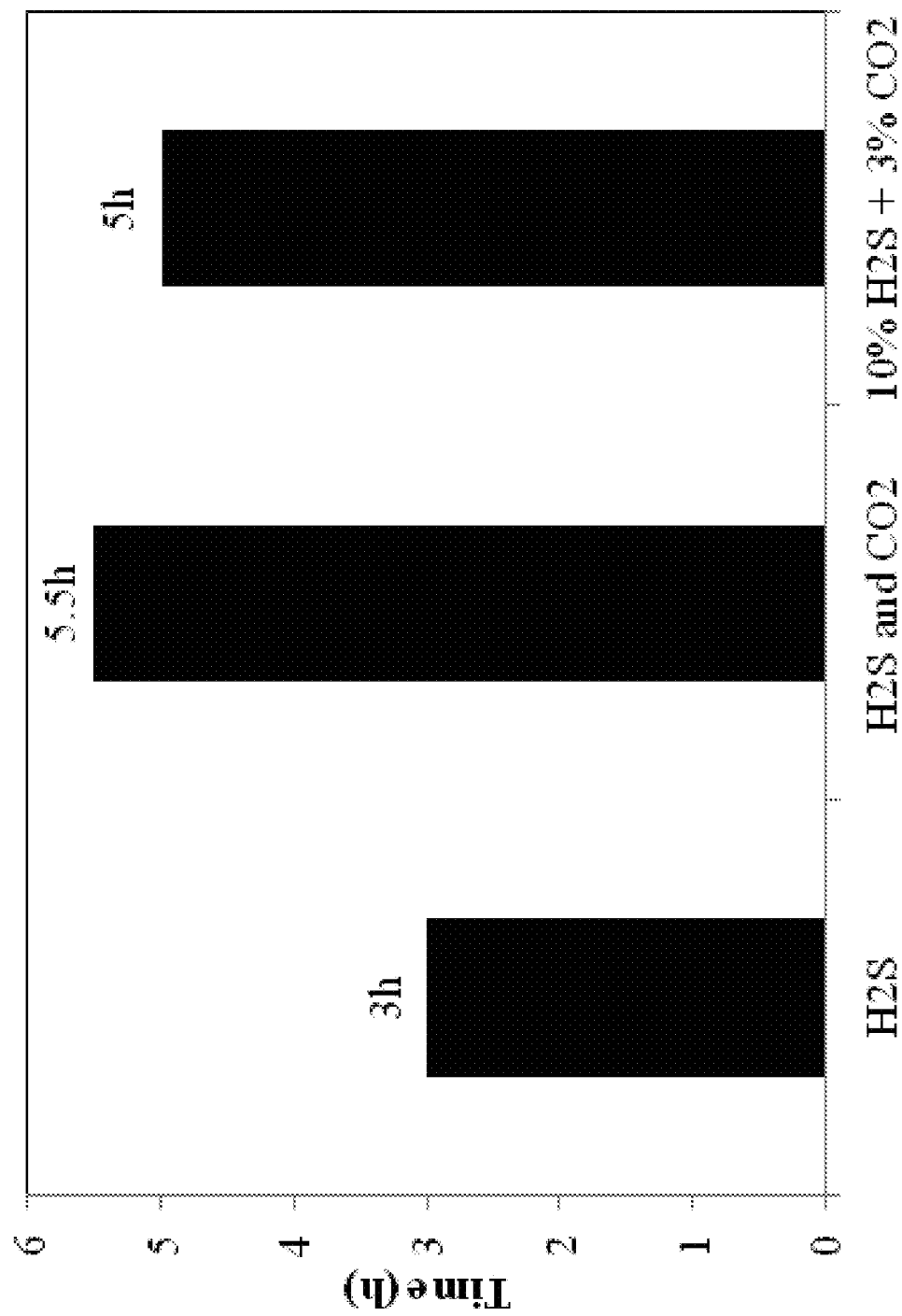

HIGH UPTAKE SULFUR SOLVENT SYSTEMS AND METHODS FOR MAKING AND USING SAME

BACKGROUND OF THE INVENTION

1. Field of the Invention

Embodiments of the present invention relates to compositions for dissolving or removing sulfur deposits from reservoir formations, production tubing and flow lines due to the production of sour gas and/or oil, and methods for making and using same.

More particularly, embodiments of the present invention relates to compositions for dissolving or removing sulfur deposits from reservoir formations, production tubing and flow lines due to the production of sour gas and/or oil, where the compositions include an effective amount of a reaction product of a diamine and an aldehyde or an aldehyde donor prepared at a diamine to aldehyde molar ratio between about 1:1 to about 1:6 and methods for making and using same.

2. Description of the Related Art

Sulfur deposition is becoming more pronounced due to the number of wells that are now sour. Canada is one of the biggest producers of sour gas wells in the world and as a result has had to come up with methods to remove the sulfur from reservoir formations, production tubing and flow lines.

Currently, sulfur solvents are either used on a continuous or batch wise basis to remove sulfur deposition from formation surfaces and equipment surfaces. The sulfur solvents typically used are based either on amines, aromatic hydrocarbons, or dimethyl disulfide (DMDS). The first two products have limited sulfur uptake at room temperature (approximately 2%) and typically retain between 5% and 15% sulfur after reacting with sulfur at 80° C. DMDS on the other hand may have up to a 100% sulfur uptake at room temperature. However, there are handling and HSE issues with using DMDS based products, which limits their application especially if the problem exists outside of Canada. Current suppliers are of these sulfur dissolution products include Weatherford International Inc. or Clearwater International LLC for aromatic hydrocarbon based products and DMDS based products, Baker Huges for amine based product, and Multi-Chem Group for aromatic hydrocarbon products.

Hydrogen sulfide ($H_2S$) is a naturally occurring component during the production of crude oil and natural gas. The presence of $H_2S$ in oil and gas is challenging because it is corrosiveness, scale forming, toxic, and posses environmental and safety concerns. In Alberta, Canada one-third of the natural gas wells contain $H_2S$. The main flow assurance problem associated with $H_2S$ is elemental sulfur formation. Precipitation of elemental sulfur occurs when the thermodynamic conditions of the process changes. High temperature and pressure favors the formation of polysulfides, whereas a decrease in temperature and pressure favors the reverse reaction of polysulfide to elemental sulfur and $H_2S$[1], shown in the reversible reaction below:

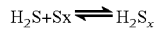

Deposition of solid elemental sulfur may block pores in producing formations and/or may block production tubing, pipelines, and/or surface equipment. Sulfur has a tendency to bond extensively to itself forming chains such as $S_8$ molecules with a variety of molecular configurations. Sulfur also has the potential to act as a fairly strong oxidizing agent and causes corrosion in stainless steel equipment, particularly pitting and other forms of localized corrosion.

Different solvents have been used in the field to remove sulfur deposition from formation faces and production tubing strings. Based on the literature[2], elemental sulfur is dissolved in sour gas either by a physical or chemical mechanism with hydrogen polysulfide. Ockelmann and Blount (1973) reported that physical solvents of high aromatic content had higher sulfur carrying capacity than lean hydrocarbons' and this agrees with what is commercially available today especially with the SULPH-AMAX® (a registered trademark of Weatherford/Lamb, Inc.) product line. Chemical solvents work as a sulfur solvent by reacting with the $S_8$ ring. Most widely used chemical solvents are based on amines, which react with elemental sulfur in the presence of $H_2S$ to produce ionic polysulfide according to the following reaction:

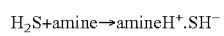

Dimethyl disulfide (DMDS) is another sulfur solvent that dissolves sulfur more effectively through both physical and chemical interaction. However, the handling of a DMDS is difficult because of its strong unpleasant odor. Currently there is a significant difference in sulfur uptake between DMDS and the amine/hydrocarbon systems currently available.

While there are several options for removing elemental sulfur deposits from reservoir formations, production tubing and flow lines, there is still a need in the art for other compositions that are effective at removing elemental sulfur deposits from reservoir formations, production tubing and flow lines.

SUMMARY OF THE INVENTION

Embodiments of the present invention provide sulfur deposit dissolving or removal compositions including a reaction product of a diamine and an aldehyde or an aldehyde donor prepared at near equal molar ratio of the aldehyde to diamine. In certain embodiments, the aldehyde or aldehyde donor, where the aldehyde has the general formula $R^1CHO$, where $R^1$ is a hydrogen atom, a hydrocarbon group having between 1 and 20 carbon atoms, and mixtures or combinations thereof, and when $R^1$ is a hydrocarbon group, then $R^1$ may be linear, branched, cyclic, or any combination thereof. In certain embodiments, the aldehyde or the aldehyde donor include formaldehyde or a formaldehyde donor. In certain embodiments, the diamines are of general formula $H_2N-R^2-NH_2$, where $R^2$ is a hydrocarbon group having between 3 and 20 carbon atoms and may be linear, branched, cyclic or any combination thereof. In certain embodiments, $R^2$ is a hydrocarbon group of the general formula $-(CH_2)_n-$, where n is an integer having a value between about 3 and about 20, an oxyhydrocarbon group of the general formula $-((CH_2)_mO)_nCH_2-$, where m is an integer having a value between 1 and 3 and n is an integer having a value between about 1 to about 10 and a cyclic hydrocarbon group having between about 6 and about 20 carbon atoms or a mixture or combination thereof. In other embodiments, the diamines include α,ω-diamino alkanes having between about 3 and 20 carbon atoms. In other embodiments, the diamines are selected from the group consisting of 1,3-diamine propane, 1,4-diamino butane, 1,5-diamine pentane, 1,6-diamine hexane, 1,7-diamine heptane, 1,8-diamine octane, higher α,ω-diamino alkanes and mixtures or combinations thereof.

Embodiments of the present invention provide methods for removing or dissolving sulfur deposit on surfaces of producing formations, downhole equipment, and/or surface equipment, where the methods include contacting the surfaces with a sulfur dissolving or removal compositions including a reaction product of a diamine and an aldehyde or an aldehyde donor prepared at near equal molar ratio of the aldehyde to diamine. In certain embodiments, the aldehyde or aldehyde donor, where the aldehyde has the general formula $R^1CHO$, where $R^1$ is a hydrogen atom, a hydrocarbon group having between 1 and 20 carbon atoms, and mixtures or combinations thereof, and when $R^1$ is a hydrocarbon group, then $R^1$ may be linear, branched, cyclic, or any combination thereof. In certain embodiments, the aldehyde or the aldehyde donor include formaldehyde or a formaldehyde donor. In certain embodiments, the diamines are of general formula $H_2N-R^2NH_2$, where $R^2$ is a hydrocarbon group having between 3 and 20 carbon atoms and may be linear, branched, cyclic or any combination thereof. In certain embodiments, $R^2$ is a hydrocarbon group of the general formula $-(CH_2)_n-$, where n is an integer having a value between about 3 and about 20, an oxyhydrocarbon group of the general formula $-((CH_2)_m)O)_nCH_2-$, where m is an integer having a value between 1 and 3 and n is an integer having a value between about 1 to about 10, a cyclic hydrocarbon group having between about 6 and about 20 carbon atoms, or mixtures and combinations thereof. In other embodiments, the diamines include α,ω-diamino alkanes having between about 3 and 20 carbon atoms. In other embodiments, the diamines are selected from the group consisting of 1,3-diamine propane, 1,4-diamino butane, 1,5-diamine pentane, 1,6-diamine hexane, 1,7-diamine heptane, 1,8-diamine octane, higher α,ω-diamino alkanes and mixtures or combinations thereof.

BRIEF DESCRIPTION OF THE DRAWINGS

The invention can be better understood with reference to the following detailed description together with the appended illustrative drawings in which like elements are numbered the same:

FIG. 13 depicts microscopic analysis of coupon surface after the experiment with SF7.

FIG. 14 depicts analysis of coupon surface after the experiment without SF7.

DETAILED DESCRIPTION OF THE INVENTION

Figure 1:
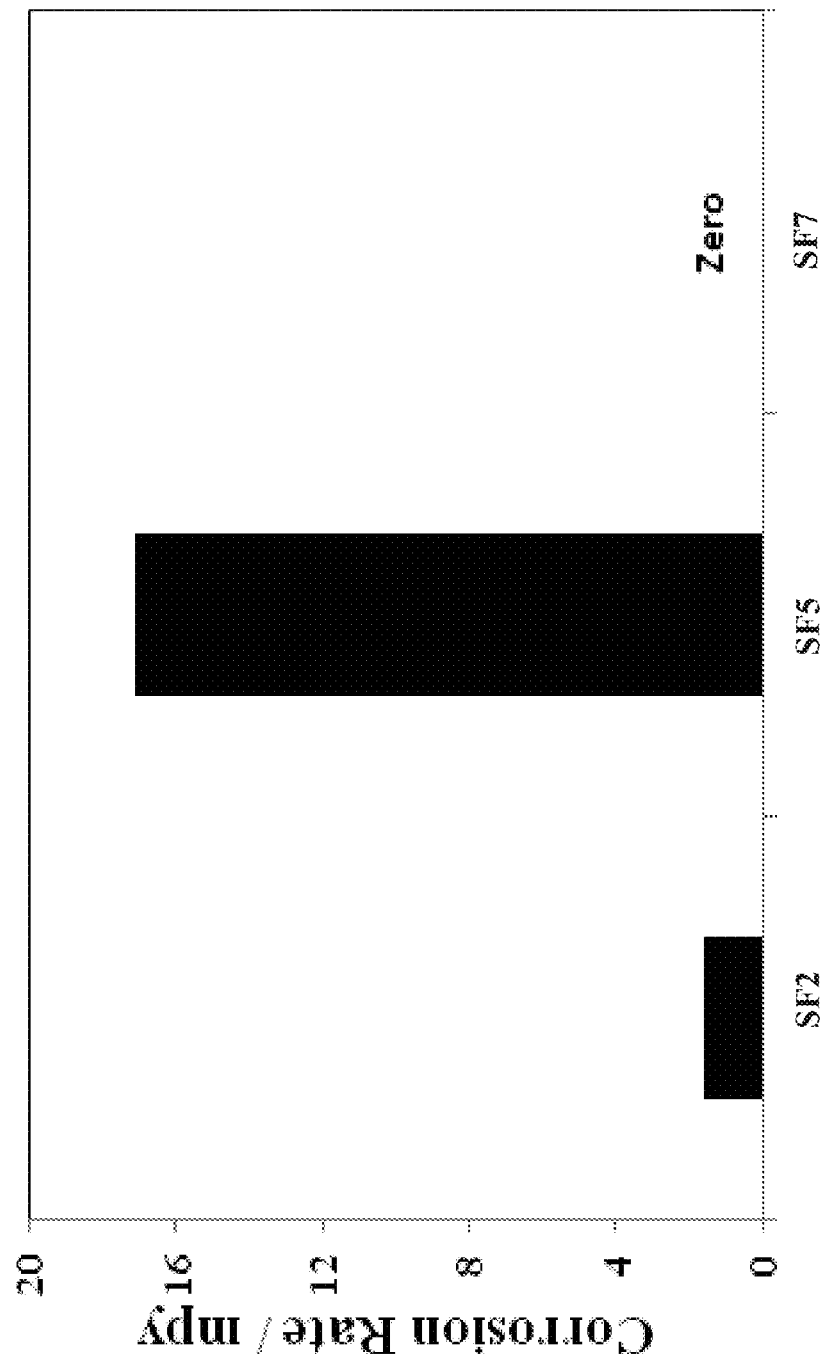
FIG. 1 depicts an experimental set up for the sulfur uptake testing.

The inventors have found that reaction products of linear and cyclic diamines with aldehydes in a diamine to aldehyde mole ratio between about 1:1 and about 1:6 to produce compositions having unique sulfur uptake capabilities compared to amines alone or hydrocarbon sulfur solvents alone. Embodiments of the invention also relate to reaction products of linear and cyclic diamines with aldehydes in a diamine to aldehyde mole ratio between about 1:1 and about 1:3 to produce compositions having unique sulfur uptake capabilities compared to amines alone or hydrocarbon sulfur solvents alone. Embodiments of the invention also relate to reaction products of linear and cyclic diamines with aldehydes in a diamine to aldehyde of 1:1 mole ratio or at or near a 1:1 mole ratio to produce compositions having unique sulfur uptake capabilities compared to amines alone or hydrocarbon sulfur solvents alone. The term about means that the molar ratio value is within ±5. In other embodiments, the term means that the molar ratio value is within ±2.5. In other embodiments, the term means that the molar ratio value is within ±2. In other embodiments, the term means that the molar ratio value is within ±1. In other embodiments, the term means that the molar ratio value is within ±0.5. In other embodiments, the term means that the molar ratio value is within ±0.1. The term at or near 1:1 mole ratio means that the ratio may vary between 0.8:1.2 and 1.2:0.8. In other embodiments, the ratio may vary between 0.9:1.1 and 1.1:0.9. In other embodiment, the ratio may vary between 0.95:1.05 and 1.05:0.95. In other embodiment, the ratio may vary between 0.99:1.01 and 1.01:0.99. The inventors have found that the compositions of this invention are capable of sulfur uptake of up to 30% sulfur at room temperature and at elevated temperatures uptakes of sulfur of greater than 60% may be achieved without any sulfur separation after 24 hours, when the treated fluid is left to equilibrate at room temperature. The inventors have found that the methods for preparation of the reaction products include drop wise addition of the amine to formalin at a controlled rate such that the temperature during addition remains below about 110° C. The reaction is then refluxed with condensate removal to a temperature of below about 130° C. The inventors performed testing on neat compositions of this invention, both virgin and spent, with respect to corrosiveness, where the testing showed that composition of this invention may be prepared having less than 1 mpy for 1018 carbon steel. Even when the compositions of this invention were diluted 50% in fresh or produced water, uptakes of sulfur between about 20% and about 30% are still achievable at 80° C. In certain embodiments of this invention, the compositions are capable of sulfur uptake of at least 10% at 25° C. In other embodiments, the compositions are capable of sulfur uptake of at least 20% at 25° C. In other embodiments, the compositions are capable of sulfur uptake of at least 30% at 25° C. In other embodiments, the compositions are capable of sulfur uptake of at least 40% at 25° C. In other embodiments, the compositions are capable of sulfur uptake of at least 50% at 25° C. In certain embodiments of this invention, the compositions are also capable of sulfur uptake of at least 10% at 80° C. In other embodiments, the compositions are capable of sulfur uptake of at least 20% at 80° C. In other embodiments, the compositions are capable of sulfur uptake of at least 30% at 80° C. In other embodiments, the compositions are capable of sulfur uptake of at least 40% at 80° C. In other embodiments, the compositions are capable of sulfur uptake of at least 50% at 80° C. In other embodiments, the compositions are capable of sulfur uptake of at least 60% at 80° C.

The new products are different from amines and hydrocarbon based sulfur solvent products due to their unique ability to significantly uptake more sulfur by up to 15 times at room temperature and 5 times at 80° C. The resultant spent products are stable at room temperature and the products will still uptake the same corresponding amount of sulfur even when diluted. The new systems are not corrosive and have no handling issues requiring special equipment to deploy the products in the field or overseas.

SUITABLE REAGENTS FOR USE IN THE INVENTION

Suitable aldehyde and aldehyde donors for use in the present invention include, without limitation, formaldehyde, formaldehyde containing solutions such as formalin, formaldehyde donors such as paraformaldehyde, aldehydes having the general formula $R^1CHO$, where $R^1$ is a hydrogen atom, a hydrocarbon group having between 1 and 20 carbon atoms, and mixtures or combinations thereof, when $R^1$ is a hydrocarbon group, then $R^1$ may be linear, branched, cyclic, or any combination thereof. Exemplary $R^1$ groups include, without limitation, a hydrogen atom, an alkyl group, an alkyleneoxide group, an aryl group, an alkaryl group, an aralkyl group, and mixtures or combinations thereof.

Suitable diamines for use in the present invention include, without limitation, diamines of the general formula $H_2N-R^2-NH_2$, where $R^2$ is a hydrocarbon group having between 3 and 20 carbon atoms and may be linear, branched, cyclic or any combination thereof. In certain embodiments, $R^2$ is a hydrocarbon group of the general formula $-(CH_2)_n-$, where n is an integer having a value between about 3 and about 20, an oxyhydrocarbon group of the general formula $-((CH_2)_m)O)_nCH_2-$, where m is an integer having a value between 1 and 3 and n is an integer having a value between about 1 to about 10, a cyclic hydrocarbon group having between about 6 and about 20 carbon atoms, and mixtures or combinations thereof. Exemplary diamine include, without limitation, α,ω-diamino alkanes having between about 3 and 20 carbon atoms. Specific examples include 1,3-diamine propane, 1,4-diamino butane, 1,5-diamine pentane, 1,6-diamine hexane, 1,7-diamine heptane, 1,8-diamine octane, higher α,ω-diamino alkanes and mixtures or combinations thereof.

EXPERIMENTS OF THE INVENTION

Preparation of the Candidate

The candidates were prepared by either adding formaldehyde, a formaldehyde solution, or a formaldehyde donor to a diamine or diamine solution or adding a diamine or a diamine solution to formaldehyde a formaldehyde solution, or a formaldehyde donor with stirring.

SF2 Synthesis

This preparation illustrates the synthesis of composition SF2, which is a reaction product of formaldehyde as a 37 wt. % aqueous solution (formalin) and 1,4-diaminobutane. Table I lists that ingredients, molar equivalents, molecular weight, and weight of ingredient used.

TABLE I

Ingredients Used to Prepare SF2

|  | TMDA* | Formalin** |
|---|---|---|
| Molar | 1 | 1 |
| MW | 88 | 30 |
| WT | 704 g | 648.6 g |

*1,4-diaminobutane (TMDA) (>99%) available from Sigma Aldrich Corporation
**Formalin (37% formaldehyde solution) available from Clearwater International, LLC The indicated amount of formalin was charged to the reactor and agitated. The indicated amount of TMDA was added drop wise to the formalin, while monitoring the temperature of the reaction mixture. The reaction is exothermic and a lot of heat was released upon contacting the ingredient. The reaction temperature was allowed to rise to 105° C. and the reaction mixture started to reflux, which occurred when about 20% of TMDA had been added. TMDA addition was stopped and the reaction mixture was allowed to cool to a temperature of about 90° C. Once the reaction mixture had cooled, TMDA drop wise addition was continued. All of TMDA was added over about 75 minutes. After all the TMDA was added into the reactor, the reaction mixture was heated to reflux. Some light yellow solid may form during addition of TMDA, but it dissolved soon after the heating was applied. The reaction mixture was heated to reflux at a reflux temperature of about 107° C. Heating was slowly increased to keep reaction mixture refluxing, but not over-heating. The color of reaction changes from colorless to light yellow. The reaction was heated over about a 6 hour period of time to a temperature of about 121° C. and 311 mL of condensate water was collected. The reaction mixture was finished by removing heating resource. The synthesis was carried out in a 3*24/40, 1*#7 2 L reactor for ACE Glass equipped with an agitation system, a 24/40 250 mm condenser, a 100 mL dropping funnel, a 25 mL condensate receiver, and 1000 mL flask.

All of the other compositions were made by an analogous synthetic procedure including compositions SF5 and SF7 using the amounts of the ingredients set forth in Table II below.

Screening of Candidates

The sulfur carrying capacity of certain formaldehyde diamine reaction based compounds were investigated through sulfur uptake testing. Simple gravimetric analysis was used to determine the amount of sulfur dissolved by each composition. In each test, a known amount of sulfur dissolving composition and sulfur was placed into a round bottom flask, which was then sparged with $H_2S$ gas for up to 3 minutes. A round bottom flask was placed on a rotary evaporator and subjected to a desired test temperature at 50 rpm as shown in FIG. 1. The experiments were stopped once all the sulfur had dissolved/reacted in the solution or the maximum time was exceeded, and the time to complete dissolution/reaction was noted. After each experiment, a weight of the remaining sulfur relative to initial sulfur present was determined and used to calculate the sulfur uptake.

Several studies were conducted to determine the best sulfur dissolving composition. Table II lists the formulas prepared for testing. Table III lists test conditions and sulfur uptake values at 80° C. for the sulfur dissolving compositions along with observations with respect to sulfur re-crystallization, once the fluids had equilibrated at room temperature.

TABLE II

Reaction Product Formulations

| Formula | Reagents | Mole Ratio |
|---|---|---|
| SF1 | amine heads and formalin | 1:3 |
| SF2 | amine heads and formalin | 1:1 |
| SF3 | 1,6-diaminohexane and formalin | 1:2 |
| SF4 | 1,2-diaminocyclohexane and formalin | 1:2.44 |
| SF5 | 1,2-diaminocyclohexane and formalin | 1:1 |
| SF6 | 1,4-diaminobutane and formalin | 1:2.44 |
| SF7 | 1,4-diaminobutane and formalin | 1:1 |
| SF8 | 1,4-diaminobutane and formalin | 1:2 |
| SF9 | 1,4-diaminobutane and formalin | 1:3 |
| SF10 | 1,4-diaminobutane and formalin | 1:6 |
| SF11 | 1,4-diaminobutane and paraformaldehyde | 1:6 |
| SF12 | amine heads and formalin | 1:2.44 |

TABLE II-continued

Reaction Product Formulations

| Formula | Reagents | Mole Ratio |
|---|---|---|
| SF13 | amine heads and formalin | 1:2.4 |

TABLE III

Sulfur Uptake Efficiency Values in a $H_2S$ Environment at 80° C.

| Formula | Time | $S_8$ Uptake | Observation |
|---|---|---|---|
| SF1 | 7 h | <20 wt % | High Sulfur re-crystallized upon cooling |
| SF2 | 2 h | 40 wt % | No sulfur re-crystallized upon cooling |
| SF3 | 3 h | <20 wt % | High Sulfur re-crystallized upon cooling |
| SF4 | 7 h | <10 wt % | High Sulfur re-crystallized upon cooling |
| SF5 | 3 h | 40 wt % | No sulfur re-crystallized upon cooling |
| SF6 | 7 h | 8 wt % | Small amount of sulfur re-crystallized upon cooling |
| SF7 | 3 h | 40 wt % | No sulfur re-crystallized upon cooling |
| SF8 | 7 h | 29 wt % | Small amount of sulfur re-crystallized upon coolin |
| SF9 | 7 h | 10 wt % | Slight sulfur re-crystallization within 24 hrs |
| SF10 | 7 h | 17 wt % | No sulfur re-crystallized upon cooling |
| SF11 | 4 h | <20 wt % | High sulfur re-crystallization upon cooling |
| SF12 | 3 h | 15 wt % | No sulfur re-crystallization, hazy like solution at the bottom |
| SF13 | 3 h | <15 wt % | High sulfur re-crystallization upon cooling |

Among the compounds tested, SF2, SF5, and SF7 exhibited the highest sulfur uptake and exhibited the fastest sulfur uptake kinetics. The above results confirm that reaction products of formaldehyde (formalin) and a diamine or mixture of diamines prepared using a near 1:1 mole ratio produces sulfur uptake compositions having the highest and fastest sulfur uptake at 80° C. While not intending to be bound by any theory, it is hypothesized that the amino groups present in the reaction products may open the eight-membered sulfur ring making the resulting opened sulfur chains more reactive with the reaction products dissolving/reacting/removing sulfur deposits.

Corrosion Screen of Best Candidates

Figure 2:
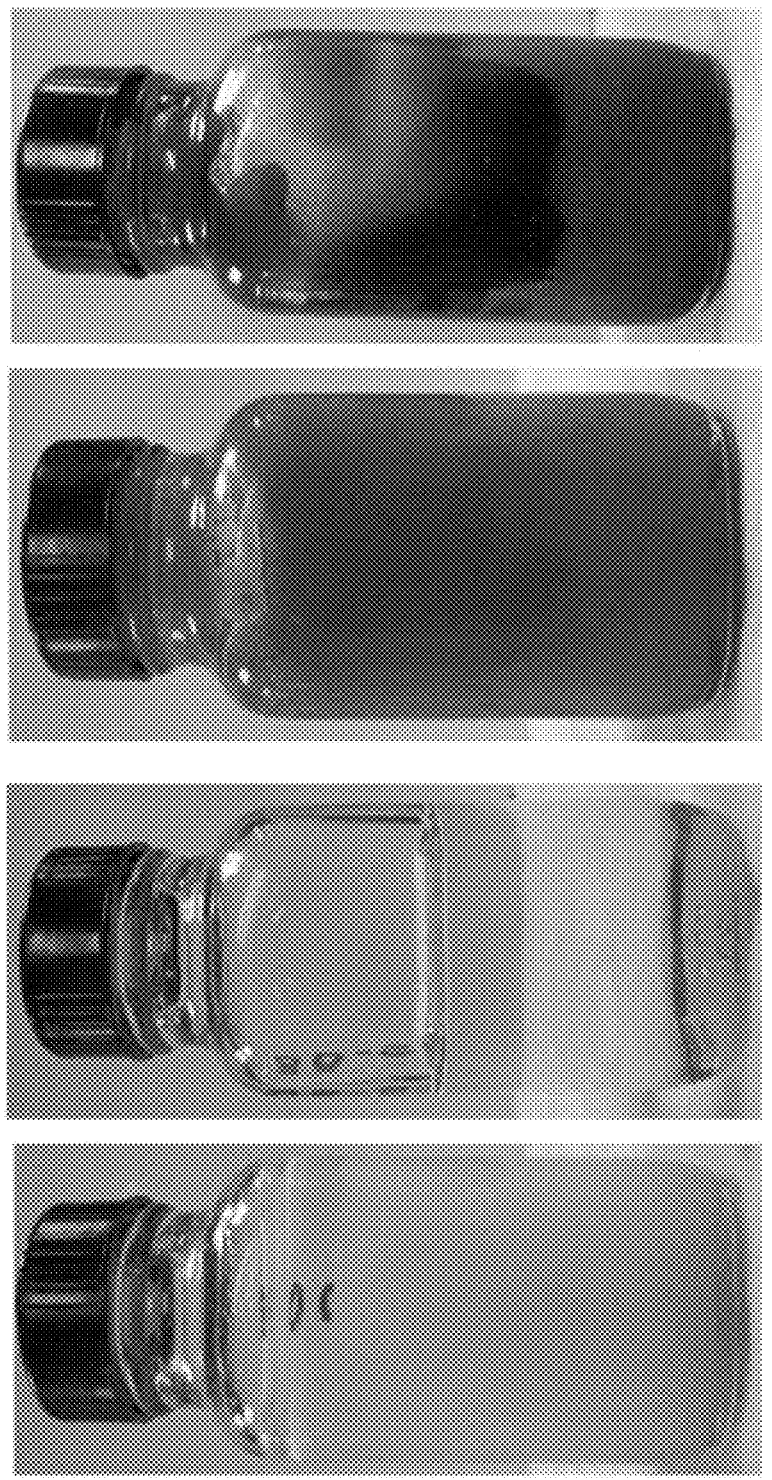
FIG. 2 depicts a comparison of corrosion rates for virgin high uptake sulfur solvents.

Based on the screening results, compositions including reaction products of formaldehyde (formalin) and a diamine or a mixture of diamines as at a near 1:1 mole ratio produce highly effective sulfur dissolving compositions as shown in FIG. 2. Thus, compositions SF2, SF5, and SF7 showed superior sulfur uptake over the other ratios tested. In order to simplify the testing, a simple corrosion test was performed to see which of these three highly effective products had the lowest corrosion rate for the unreacted products. We had already found that certain amine type sulfur removal compositions cause high corrosion rates, which may be problematic when applying them in the field. The results showed that SF7 had the lowest corrosion rate, while SF5 showed the highest corrosion rate (17.10 mpy). Because SF7 and SF2 showed the lowest corrosion rates, these products were chosen for $H_2S$ tolerance testing.

$H_2S$ Tolerance Testing of SF2 and SF7

It is common knowledge that $H_2S$ scavengers based on triazine chemistry have a tendency to form solids in the presence of excess $H_2S$, which could cause detrimental problems as these solids are not generally soluble in known solvents. In order to check the $H_2S$ solubility tolerance of SF2 and SF7, 100% $H_2S$ was bubbled through solutions of SF2 and SF7 for 30 minutes to see if any solids were formed. SF5 was not chosen due to its high corrosion rate. Because there was a possibility that unreacted formaldehyde was present, the chosen products were heated to 120° C. under vacuum to remove any water/methanol and formaldehyde present.

Figure 3A:
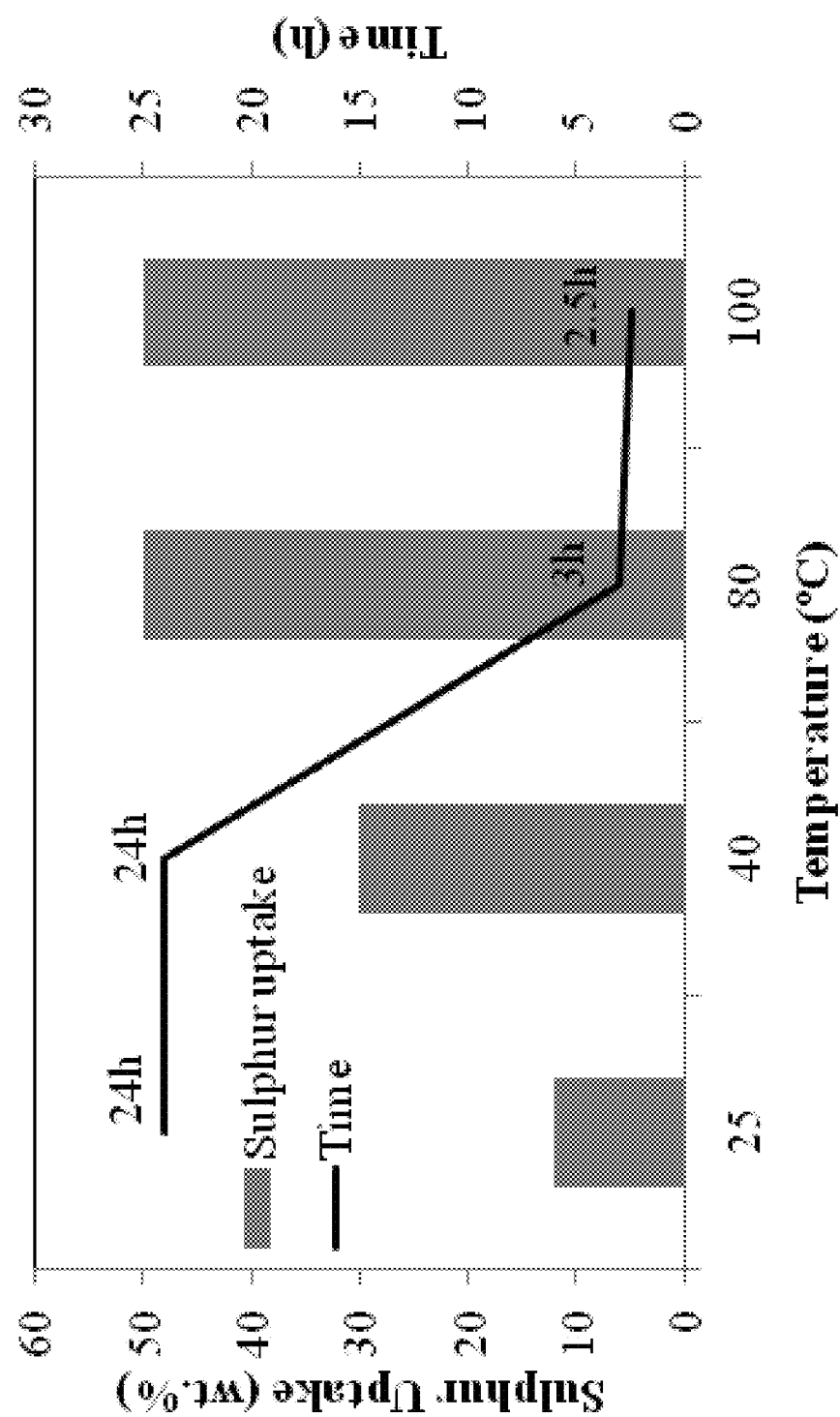
FIG. 3 depicts a visual comparison of $H_2S$ tolerance for regular and concentrated versions of SF2 and SF7.
Figure 3B:
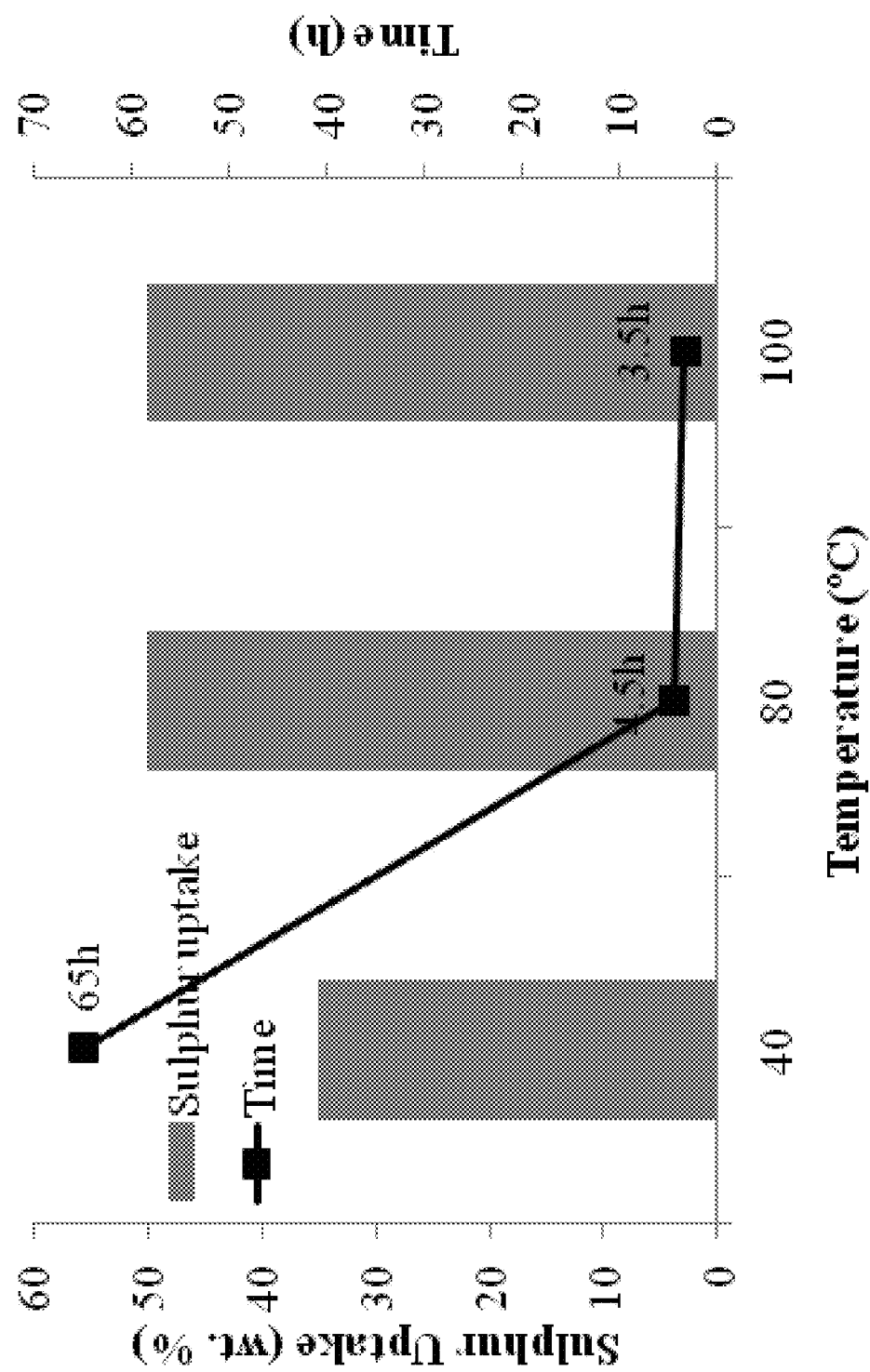

The results showed that the amine heads version SF2 even after the removal of any excess formaldehyde showed solids formation in the presence of excess $H_2S$, whereas the 1-4-diaminobutane version SF7 did not show any solids formation even after 10 days as shown in FIG. 3. As a result of the $H_2S$ tolerance test and the corrosion test, we proceeded with further testing using SF7.

SF7 Sulfur Uptake Kinetics

In order to evaluate the kinetics or how fast elemental sulfur is dissolved/reacted using SF7, experiments were conducted at different temperatures in a rotary evaporator as described above. The testing was performed with and without the presence of $H_2S$ to assess, if $H_2S$ catalyzed the reaction.

Figure 4:
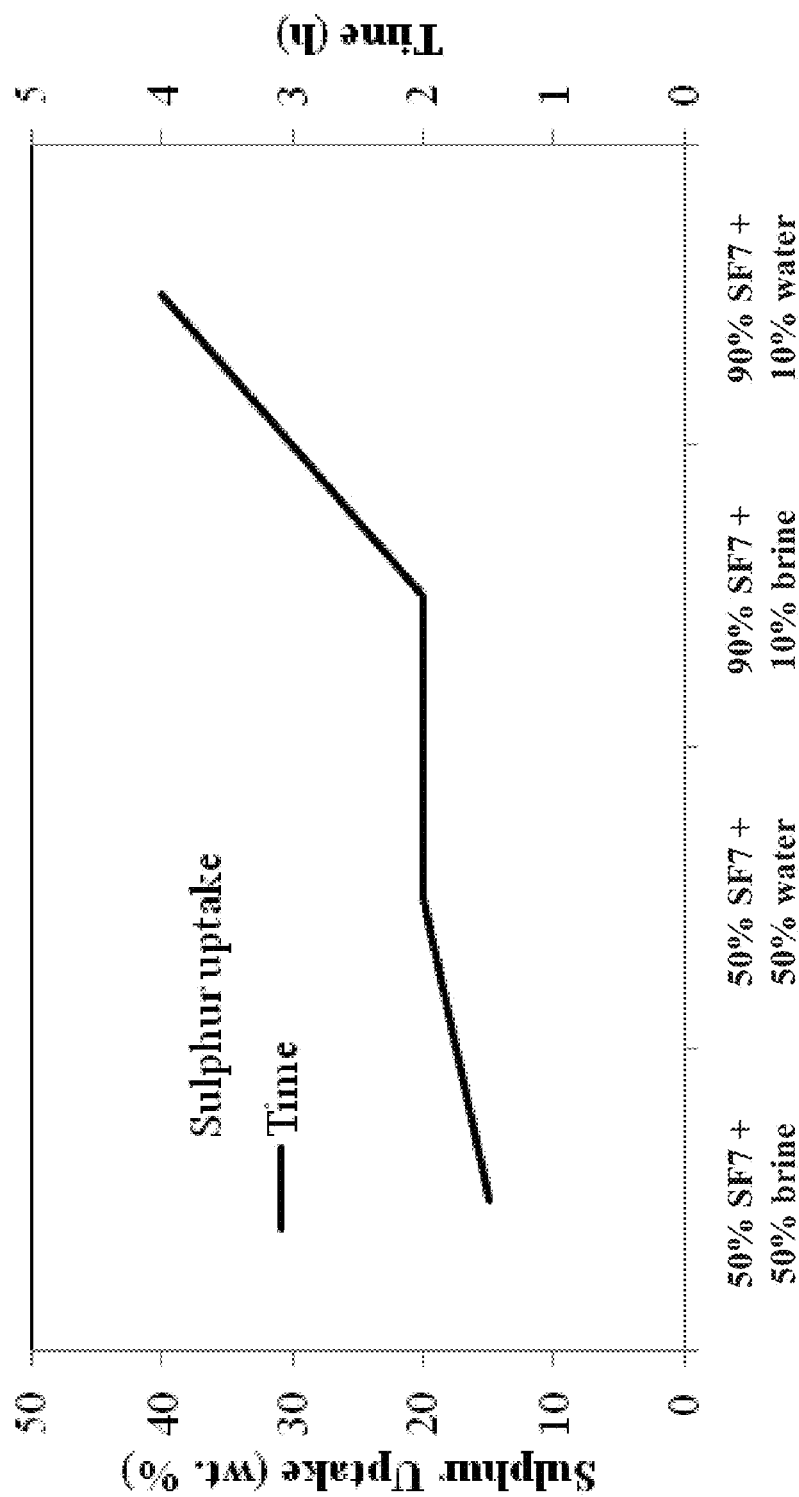
FIG. 4A depicts sulfur uptake kinetics at different temperature (Presence of $H_2S$).
FIG. 4B depicts sulfur uptake kinetics at different temperature (Absence of $H_2S$).
FIG. 4C depicts effect of $CO_2$ on the Sulfur uptake kinetics for SF7 at 80° C.

In the presence of $H_2S$, the reaction kinetics was faster and the uptake was 50 wt % at 80° C. and 100° C. Once the fluids had equilibrated at room temperature, the sulfur remains in solution for 12 hours after which the sulfur re-crystallized. In order to reduce sulfur re-crystallization, experiments were carried out with 40 wt % sulfur. At 40 wt. % sulfur, sulfur did not re-crystallize from the SF7 containing composition. Referring now to FIG. 4A, as the reaction temperature was increased, the rate and uptake of sulfur by a SF7 containing composition increased. While temperature is known to increase rates of reaction, it was unexpected that increasing temperature would result in the simultaneous increase in rate and uptake.

In the absence of $H_2S$, the sulfur uptake kinetics was noticeably slower at 40° C. as it took almost 65 hours to dissolve 35 wt. % sulfur compared with 24 hours in the presence of $H_2S$. In addition, more sulfur re-crystallization was observed from tests conducted at 80° C. and 100° C. compared with tests performed in the presence of $H_2S$. Re-crystallization of sulfur began after two days in both 80° C. and 100° C. tests as shown in FIG. 4B.

After the experiments, the test samples were tested for the presence of $H_2S$ using a Multiwarn $H_2S$ monitor. Experiments conducted at room temperature and 40° C. showed no $H_2S$/Mercaptan was present in the headspace; however, the experiments conducted at greater than or equal to 80° C. generated $H_2S$/Mercaptan. It is possible that at higher temperatures, the process actually uses $H_2S$ to catalyze the reaction and hence the re-generation.

In order to compare the influence of $CO_2$ on sulfur uptake and uptake rate, experiments were conducted in the presence of $H_2S$ and $CO_2$ to see how long it took to uptake 40 wt. % of elemental sulfur. The SF7 containing composition was purged as follows and then placed on the rotor-evaporator:

Test 1 was sparged with $H_2S$ for 3 minutes. Test 2 was sparged with 100% $CO_2$ for 1.5 minutes and 100 $H_2S$ for 1.5 minutes for a total of 3 minutes. Test 3 was sparged with a gas mixture containing 3% $CO_2$ and 10% $H_2S$ for 3 minutes as shown in FIG. 4C. The data showed that the reaction proceeds at slower rate (approximately 50%) in the presence of $CO_2$ compared to $H_2S$ alone.

SF7 Sulfur Uptake Efficiency in the Presence of Water and Brine

SF7 uptake at 80° C. was reduced by 50% by adding 50% water or synthetic brine (100,000 ppm chlorides) however if we take in to account the dilution factor then the uptake is not affected by either fresh water or brine. With respect to the kinetics it was observed that the high salinity brine showed a 50% reduction in the time required to uptake 40% sulfur when 10% brine was present. There was only a marginal improvement in uptake kinetics when 50% brine was used as shown in FIG. 5.

Figure 5:
FIG. 5 depicts sulfur uptake kinetics for SF7 in a $H_2S$ environment.
Figure 6:
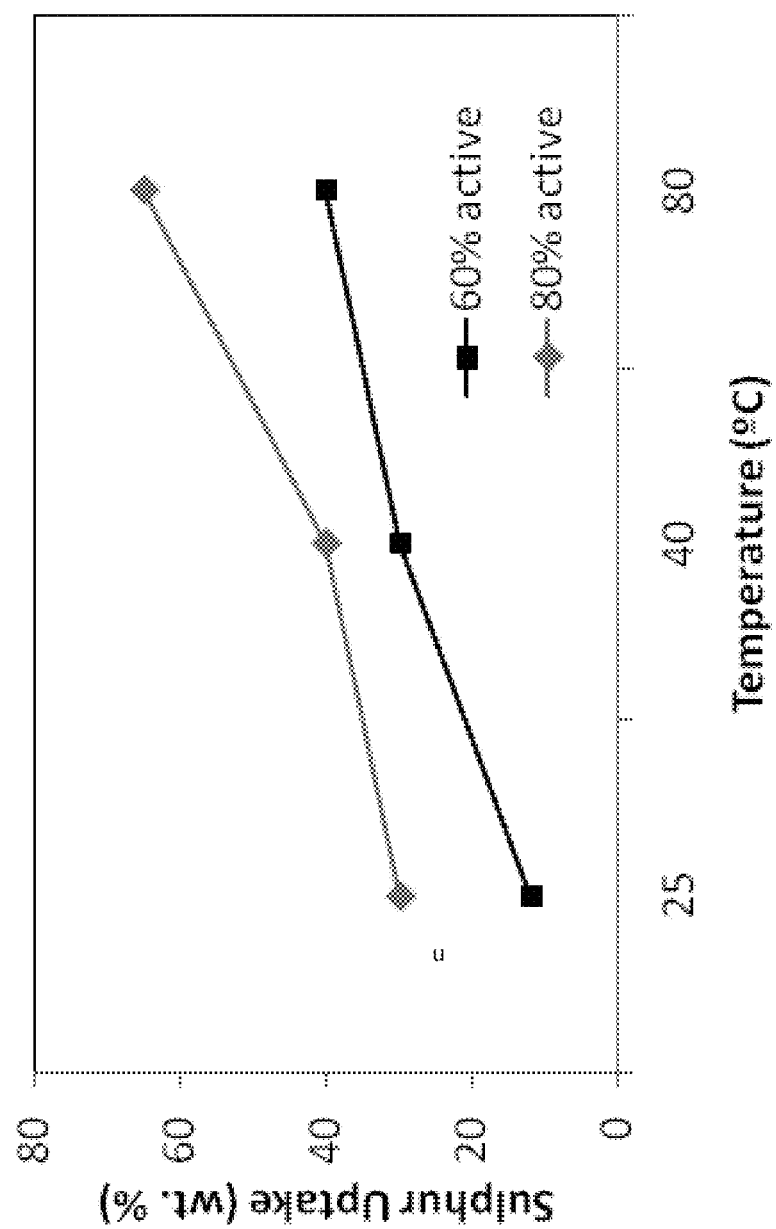
FIG. 6 depicts comparison of Spent SF7 after test.

The data from FIG. 5 shows that there is no negative effect on the sulfur uptake when using either freshwater or brine. It was observed that when we use the brine in the system it forms a hazy solution at the bottom after 24 hours as shown in FIG. 6. The solution was not a solid and moved freely and is not expected to be a problem SF7 Sulfur Uptake under Temperature and Pressure Solubility of sulfur in the sour gas depends upon temperature, pressure and sour gas composition. Hence, in this stage, bench top autoclave was used to conduct the sulfur uptake under pressure (100 psi) and different composition of $H_2S$. 40 wt % of sulfur in 200 g of sulfur solvent was placed in an autoclave and then pressurized with different compositions of $H_2S$ gas as shown in Table IV. The autoclave was heated to 80° C. for the predetermined time of 16 h at 300 rpm. Upon test completion, the autoclave was degassed in the fume hood and the sulfur solvent was removed to check its sulfur uptake.

TABLE IV

Sulfur uptake Testing Parameters

| Test Number | Gas composition |
| --- | --- |
| Test 1 | $H_2S$ sparge for 3 mins |
| Test 2 | 2% $H_2S$ |
| Test 3 | 20% $H_2S$ |
| Test 4 | 20% $H_2S$ + 3% $CO_2$ |
| Test 5 | 20% $CO_2$ + 3% $H_2S$ |

Tests 1 to Test 4 showed a 40 wt % sulfur uptake in 16 h, whereas Test 5, which was a $CO_2$ dominant environment (20% $CO_2$+3% $H_2S$), showed a 12.5 wt. % sulfur uptake. The decrease in the sulfur dissolution activity may be due to the formation of carbamate salts during the test.

$$2R-NH_2+CO_2 \rightarrow RHNCOO^-.RNH_3^+$$

Literature also reported that the amine-based solvent in $CO_2$-dominant environment had lower sulfur uptake than that for predominantly $H_2S$ environment[6]. After completing the experiment all samples were kept at room temperature for several days and no re-crystallization of sulfur was found in Test 1 to Test 4, however sulfur did re-crystallize in the $CO_2$ dominant environment after 24 hours.

SF7 Sulfur Uptake for Concentrated

The water content of SF7 was determined using the Karl Fischer method, and it was measured at 40 wt %. Using rotor-evaporator at a temperature of 120° C., 20 wt % of a water/methanol/formaldehyde blend was removed from the composition and the activity was increased to 80 wt. %. The concentrated SF7 sulfur uptake was conducted at different temperatures, namely room temperature, 40° C. and 80° C. for 24 hours.

Figure 7:
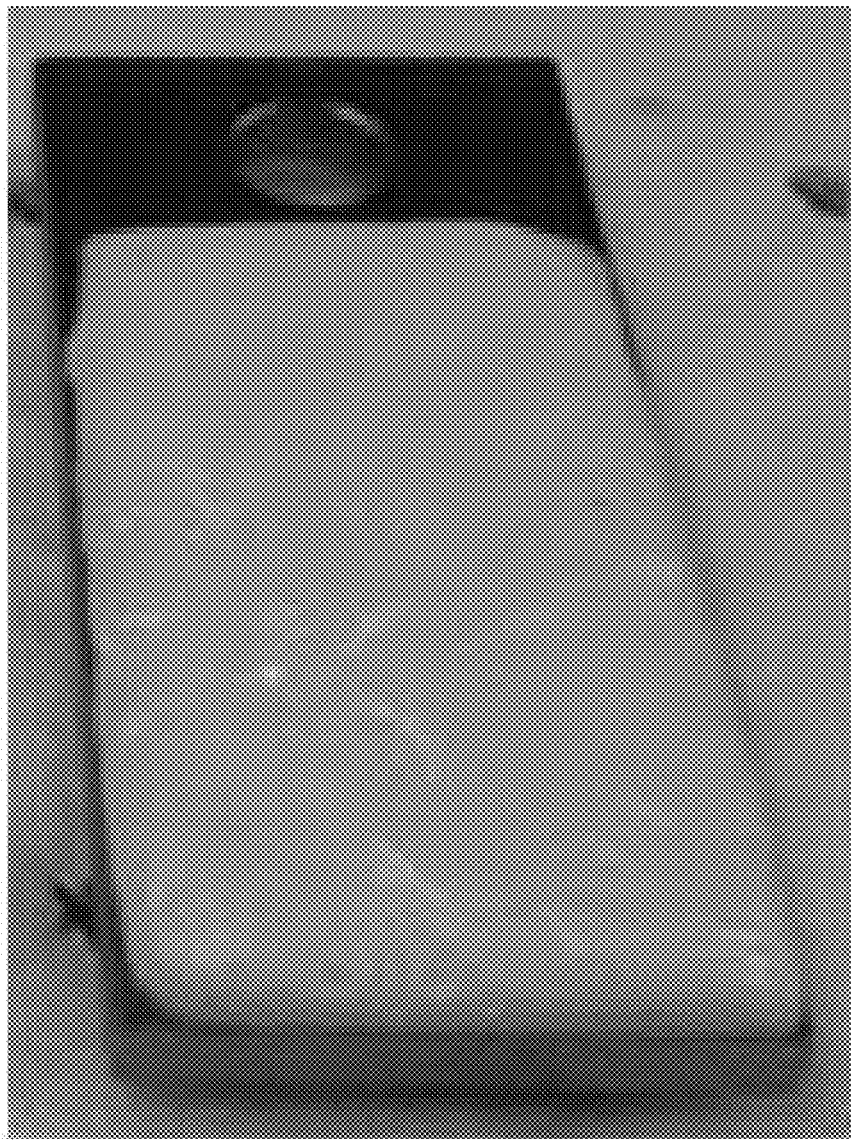
FIG. 7 depicts a comparison of regular versus concentrated SF7.

As can be seen from FIG. 7 the uptakes were 30 wt. % at room temperature and 65 wt. % at 80° C. No sulfur re-crystallized was observed in the system even after one week.

The increase in the room temperature sulfur uptake suggests that something more maybe happening than just removing water, methanol, and formaldehyde as this uptake doubles. It could be possible that we are driving the reaction to completion as per Le Chateliers Principle or we may be even polymerizing the reaction product.

Corrosion Testing

Figure 8:
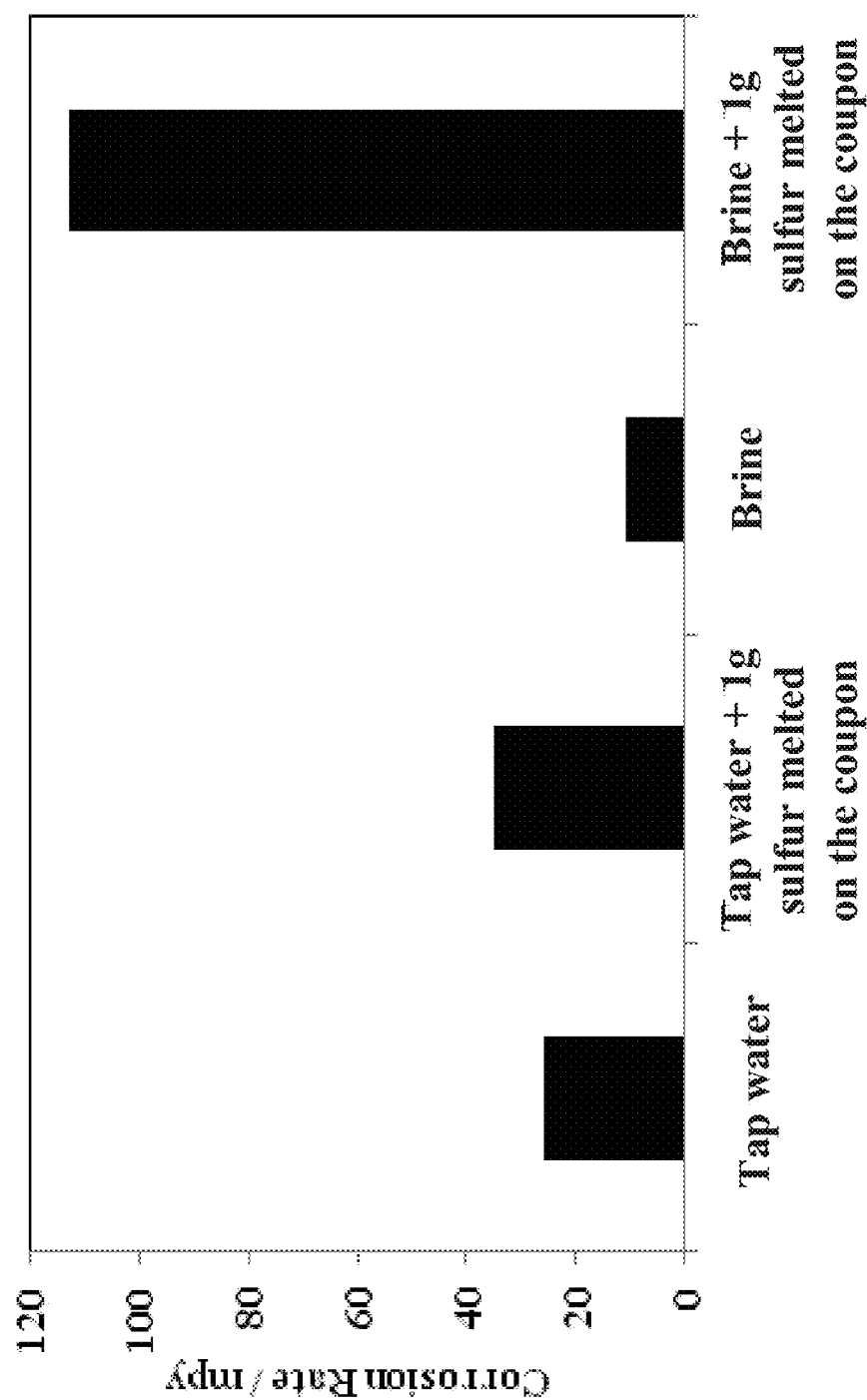
FIG. 8 depicts an autoclave for corrosion test for under deposit corrosion testing.

This part of the study was performed to evaluate the corrosion properties of the sulfur solvent on 1018 carbon steel as per what could potentially happen in the field. Corrosion studies were performed on the virgin and spent fluids in the presence of freshwater and brine (100,000 mg/L Chloride) to simulate the two extremes seen in the field. The tests were performed according to the set up shown in FIG. 8.

Each coupon was pre-weighed and immersed in a test solution and placed in a high-temperature, high-pressure autoclave for 3 days. Table V lists the experimental conditions for the corrosion test. After 3 days, the coupons were rinsed to remove residual test solution and loose corrosion products with inhibited hydrochloric acid and dried. Each coupon was weighed and the change in weight during immersion was used to determine the corrosion rate.

TABLE V

Stirred Autoclave Test Conditions

| | |
| --- | --- |
| Temperature | 80° C. |
| $H_2S$ partial Pressure | 100 psi |
| $CO_2$ Partial Pressure | 15 psi |
| Total Pressure | 500 psi |
| Test Duration | 3 days |
| Flow Regime | No Stirring |

Testing was also run to simulate under deposit elemental sulfur corrosion to see whether there was any negative impact from using the new solvent. In the presence of water, sulfur is capable of producing acid by a hydrolysis reaction which leads to severe corrosion problems. Further, elemental sulfur can cause extremely high corrosion rates when it has direct contact with steel surfaces[7].

Figure 9:
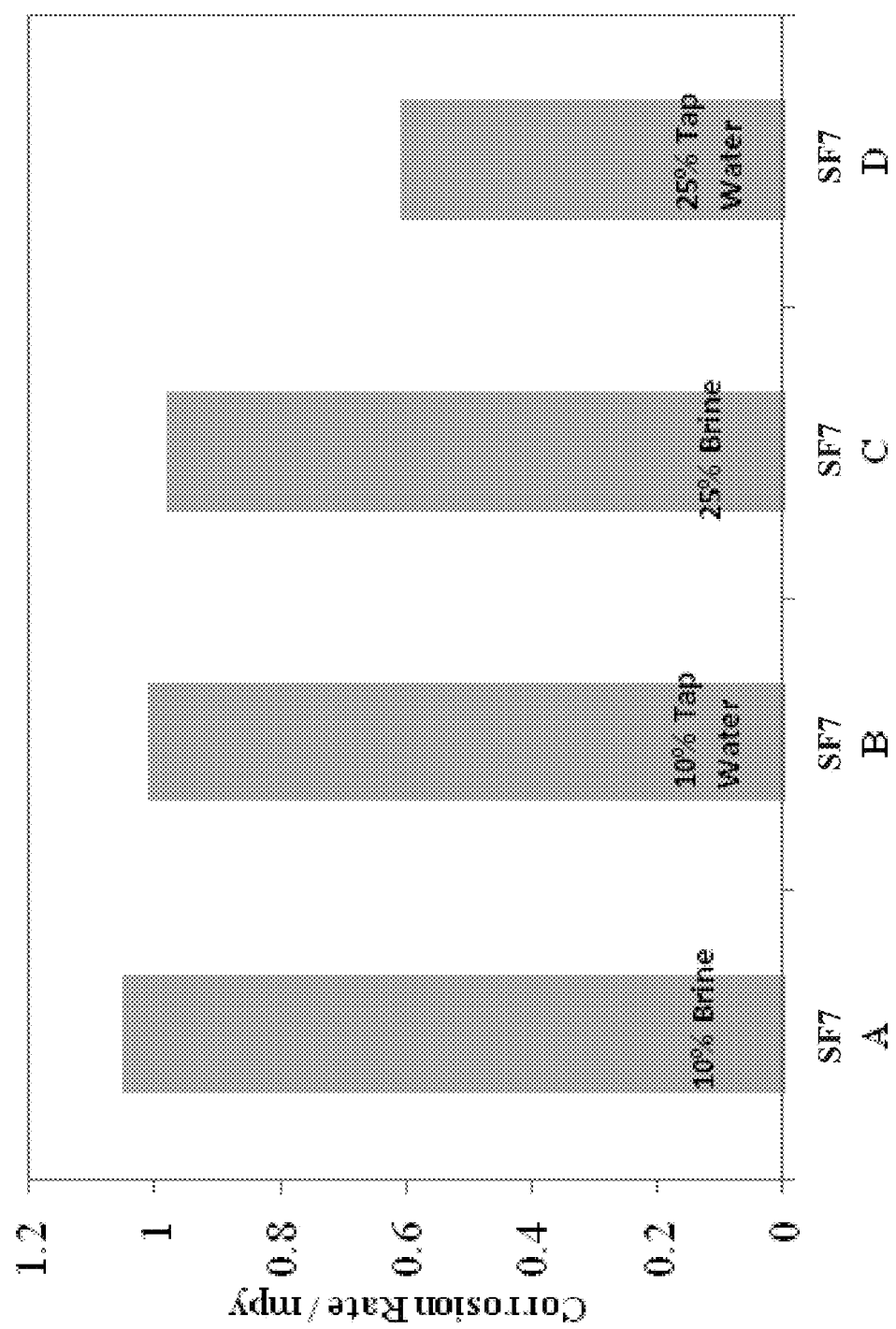
FIG. 9 depicts sulfur melted on the coupons.

The corrosion study was split in two parts where corrosion testing was done without sulfur and the second where sulfur was melted on to the coupon to simulate under deposit corrosion as can be seen in FIG. 9. In the first part, we evaluated the effect of just the sulfur dissolution composition virgin and spent compositions. In the second part of the study, we simulated sulfur deposition by melting 3 grams of elemental sulfur on one side of the coupon as per FIG. 9 and measured the corrosion rate in the presence of the virgin sulfur dissolution composition.

Spent dissolution composition was prepared by sparging the composition with $H_2S$ and then adding 30 wt % of sulfur and heating to 80° C. for 16 hours. After 16 hours, the spent composition was cooled down to room temperature and loaded into the autoclave for the corrosion test. The corrosion tests were set up as per Table VI using the conditions in Table V.

TABLE VI

Composition of the Spent Sulfur Dissolution Compositions

| Spent Dissolution Composition | Formulation |
| --- | --- |
| A | 90% SF7 + 10% brine |
| B | 90% SF7 + 10% tap water |
| C | 75% SF7 + 25% brine |
| D | 75% SF7 + 25% tap water |

Figure 10:
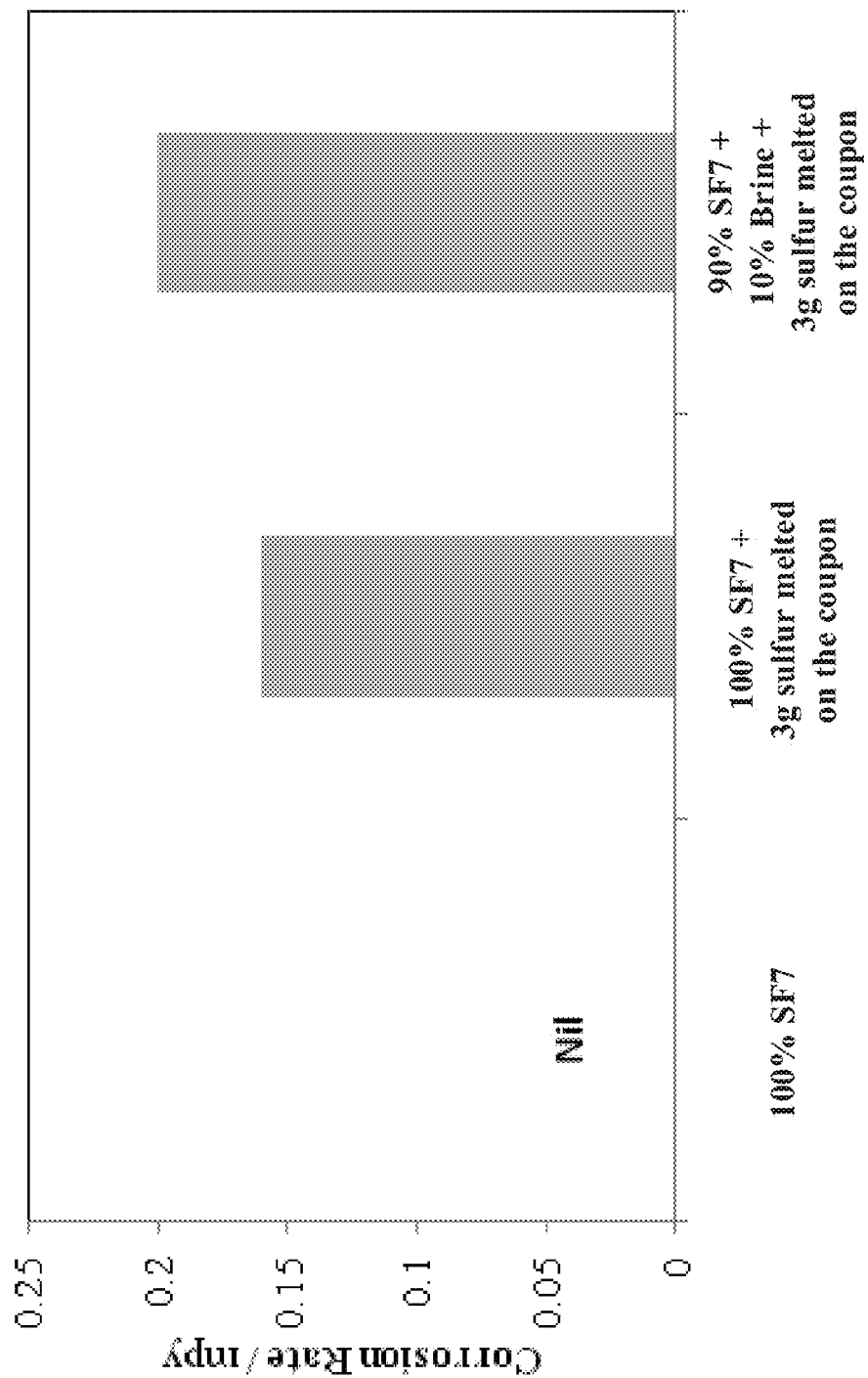
FIG. 10 depicts corrosion rate for brine and tap water with/without sulphur.
Figure 11:
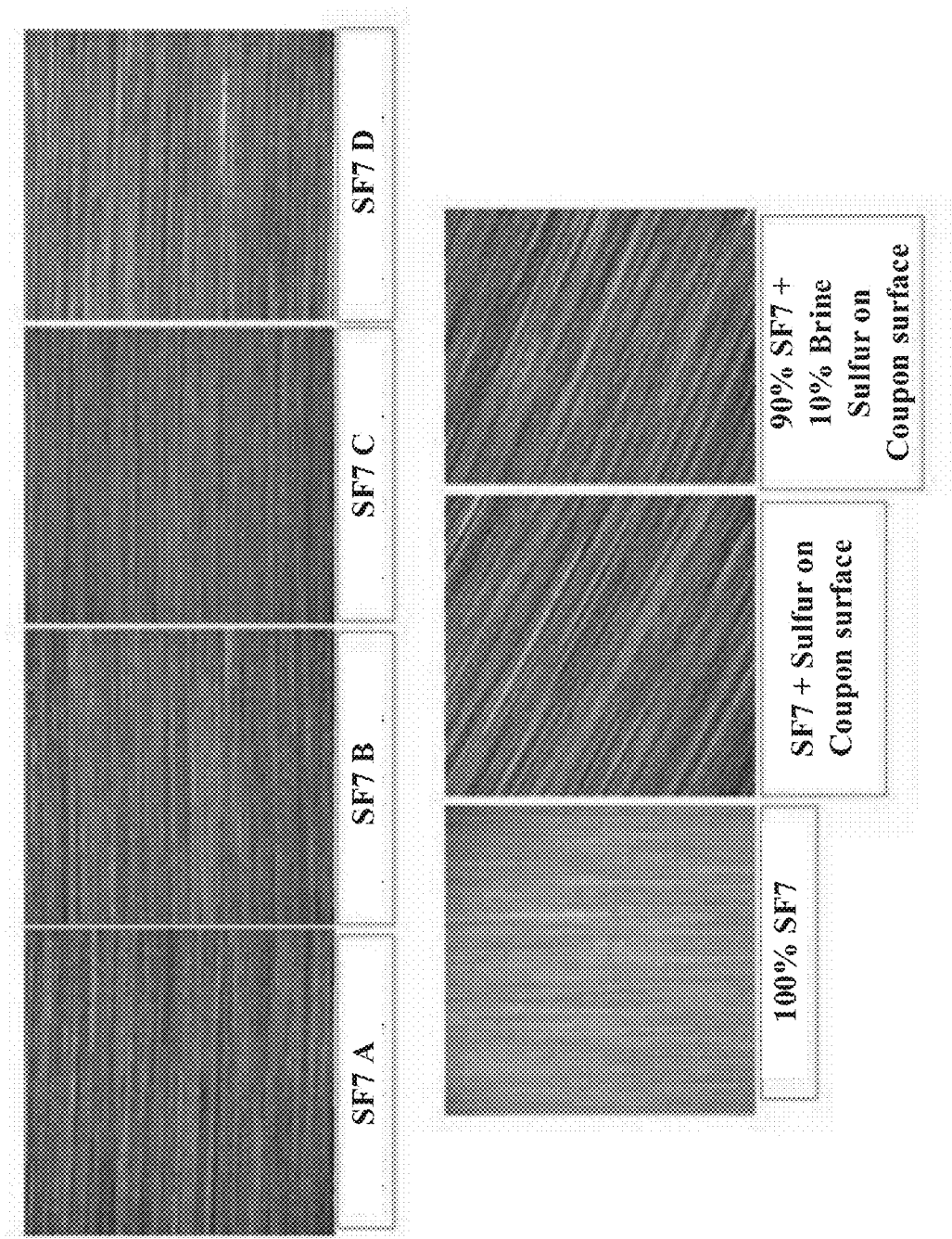
FIG. 11 depicts corrosion Rate for Spent Scavengers in the presence of brine and tap water.
Figure 12:
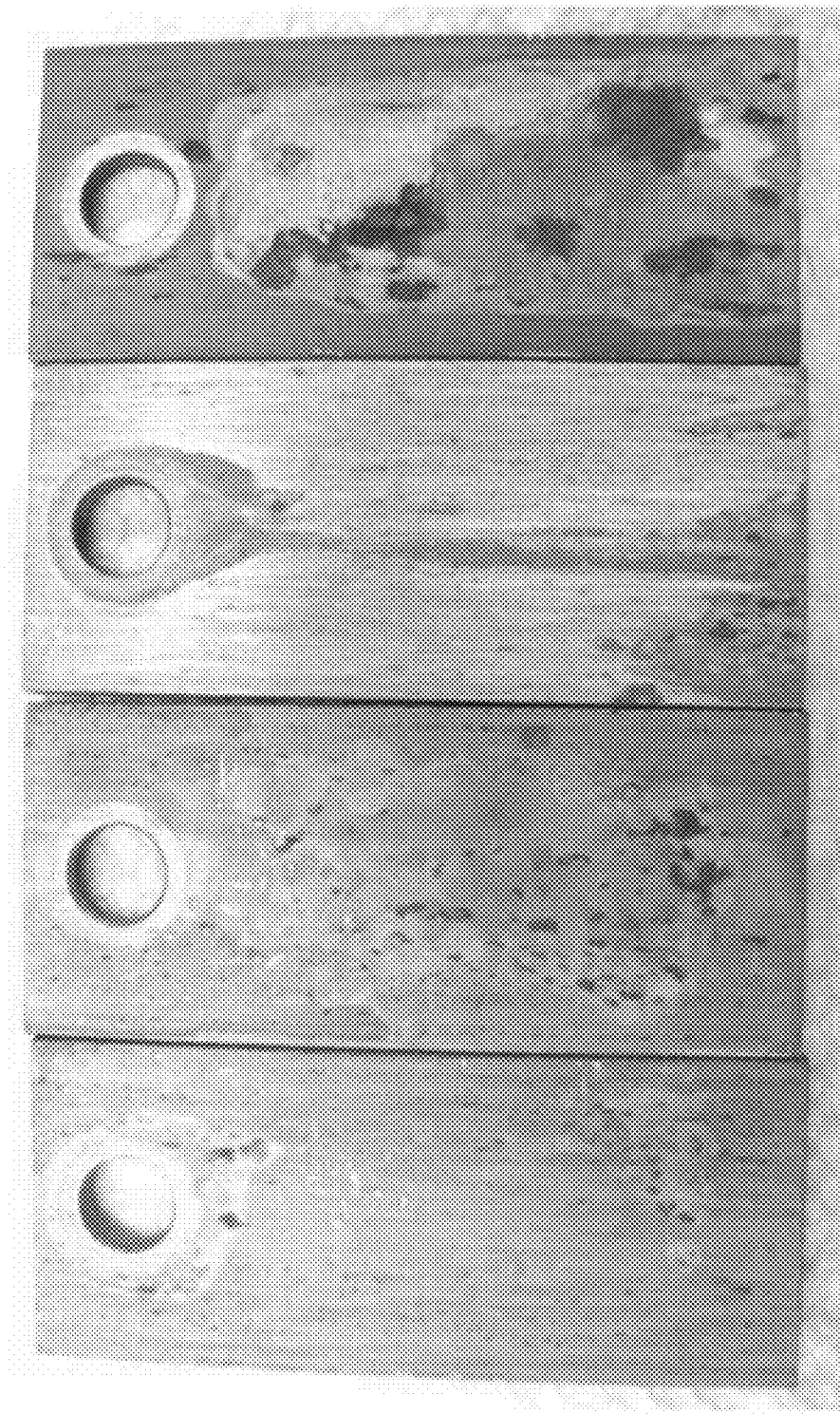
FIG. 12 depicts corrosion rate for simulated under deposit sulphur corrosion in the presence of SF2.

FIG. 10 showed the rate of corrosion for brine and tap water with/without sulfur. FIG. 11 showed the rate of corrosion for the spent sulfur solvent in the presence of brine and tap water. FIG. 12 showed the rate of corrosion for simulated under deposit sulfur corrosion. FIGS. 10 and 14 showed how corrosive sulfur is when it is deposited on a metal surface with corrosion rates of 120 mpy and severe pitting. Even with freshwater one can see corrosion rates of 20 mpy without sulfur and nearly 40 mpy with sulfur with visible pitting. FIG. 11 shows the corrosion rates for the spent solvent and the results clearly show that the corrosion rate is extremely low compared with the blank and there were no visible pits as can be seen from FIG. 13. FIG. 12 clearly shows that even in the presence of sulfur deposition SF7 actually aids in preventing corrosion as compared to the blank. The virgin SF7 exhibits no corrosion potential and as a result shows zero corrosion even in such a corrosive environment.

REFERENCES CITED IN THE INVENTION

The following references were cited in the specification:
1. Hyne, J. B, "Study aids predication of sulfur deposition in sour gas wells," Oil & Gas J. (25 Nov. 1968) 107.
2. S. A. Al-Mutairi, A. I. Abdulhadi, and I. M. Al-Taie, "Sour Gas Dehydration System: Corrosivity and Selection in the Presence of Elemental Sulfur", Corrosion/2003, Paper no. 07397, NACE International, Houston, Tex., 2007.
3. H. Ockelmann, F. E. Blount. "Ten Years Experience with Sour Gas Production in Germany", Paper presented at 48th Annual Fall Meeting of the Society of Petroleum Engineers of AIME (September 1973).
4. T. K. Wiewiorowski, F. J. Touro, J. Phys. Chem. 70 (1966) 234-238.
5. R. A. Marriott, Ed Fitzpatrick, K. L. Lesage, "The solubility of $H_2S$ in liquid sulfur"Fluid Phase Equilibria 269 (2008) 69-72.
6. L. J. May and W. Wamburi, "Sulfur solvents: Understanding operating envelopes through laboratory studies and field case histories," NACE International, Houston, Tex., 2007.
7. H. Sun, H. Fang, J. Davis, R. Hudgins, "Elemental Sulfur Corrosion and Inhibition in the Presence of Sulfur Solvent," NACE International, Houston, Tex., 2011.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A composition for chemically removing sulfur from the surface of producing formations and production equipment comprising:
    at least one diamine/aldehyde reaction product,
    where the diamine include the diamines have the general formula $H_2N-R^2-NH_2$, where $R^2$ is selected from the group consisting of a hydrocarbon group of the general formula $-(CH_2)_n-$, where n is an integer having a value between about 3 and about 20, an oxyhydrocarbon group of the general formula $-((CH_2)_m O)_n CH_2-$, where m is an integer having a value between 1 and 3 and n is an integer having a value between about 1 to about 10, a cyclic hydrocarbon group having between about 6 and about 20 carbon atoms, and mixtures or combinations thereof,
    where a diamine to aldehyde mole ratio of between about 0.9:1.1 and about 1.1:0.9, and
    where the composition chemically removes sulfur from formation surfaces and production equipment in contact with fluids and/or gases that deposit sulfur on formation surfaces and production equipment.

2. The composition of claim 1, wherein the composition uptakes at least 10 wt. % sulfur at 25° C.

3. The composition of claim 1, wherein the mole ratio is between about 0.95:1.05 and about 1.05:0.95.

4. The composition of claim 1, wherein the mole ratio is between about 0.99:1.01 and about 1.01:0.99.

5. The composition of claim 1, wherein the mole ratio is 1:1.

6. The composition of claim 1, wherein the diamines are selected from the group consisting of α,ω-diamino alkanes having between about 3 and 20 carbon atoms.

7. The composition of claim 6, wherein the diamines are selected from the group consisting of 1,3-diamine propane, 1,4-diamino butane, 1,5-diamine pentane, 1,6-diamine hexane, 1,7-diamine heptane, 1,8-diamine octane, higher α,ω-diamino alkanes and mixtures or combinations thereof.

8. The composition of claim 1, wherein the aldehyde is selected from the group consisting of formaldehyde, paraformaldehyde, and mixtures or combinations thereof and wherein the diamines are selected from the group consisting of 1,3-diamine propane, 1,4-diamino butane, 1,5-diamine pentane, 1,6-diamine hexane, 1,7-diamine heptane, 1,8-diamine octane, and mixtures or combinations thereof.

9. The composition of claim 1, wherein the aldehyde is selected from the group consisting of aldehyde and aldehyde donors, where the aldehydes have the general formula $R^1 CHO$, where $R^1$ is a hydrogen atom, a hydrocarbon group having between 1 and 20 carbon atoms, and mixtures or combinations thereof and when $R^1$ is a hydrocarbon group, then $R^1$ is linear, branched, cyclic, or any combination thereof.

10. The composition of claim 9, wherein $R^1$ is selected from the group consisting of a hydrogen atom, alkyl groups, oxyhydrocarbon groups, aryl groups, alkaryl groups, aralkyl groups, and mixtures or combinations thereof.

11. The composition of claim 1, wherein the aldehyde is selected from the group consisting of formaldehyde, paraformaldehyde, and mixtures or combinations thereof.

12. A method for dissolving sulfur from formation surfaces and equipment surfaces associated with a producing formation comprising:
    contacting a producing formation and associated equipment with a composition including an effective amount of a sulfur dissolution system comprising at least one diamine/aldehyde reaction product,
    where the diamines have the general formula $H_2N-R^2-NH_2$, where $R^2$ is selected from the group consisting of a hydrocarbon group of the general formula $-(CH_2)_n-$, where n is an integer having a value between about 3 and about 20, an oxyhydrocarbon group of the general formula $-((CH_2)_m O)_n CH_2-$, where m is an integer having a value between 1 and 3 and n is an integer having a value between about 1 to about 10, a cyclic hydrocarbon group having between about 6 and about 20 carbon atoms, and mixtures or combinations thereof,
    where a diamine to aldehyde mole ratio of between about 0.9:1.1 and about 1.1:0.9, and where the composition dissolves sulfur from formation surfaces and production equipment in contact with fluid that deposit sulfur on formation surfaces and production equipment.

13. The method of claim 12, wherein the composition uptakes at least 10 wt. % sulfur at 25° C.

14. The method of claim 12, wherein the composition uptakes at least 10 wt. % sulfur at 25° C. and at least 10 wt. % sulfur at 80° C. and the mole ratio is between about 0.95:1.05 and about 1.05:0.95.

15. The method of claim 12, wherein the composition uptakes at least 20 wt. % sulfur at 25° C. and at least 20 wt. % sulfur at 80° C. and the mole ratio is between about 0.99:1.01 and about 1.01:0.99.

16. The method of claim 12, wherein composition uptakes at least 30 wt. % sulfur at 25° C. and at least 30 wt. % sulfur at 80° C. and the mole ratio is 1.1.

17. The method of claim 12, wherein the composition uptakes at least 40 wt. % sulfur at 25° C. and at least 40 wt. % sulfur at 80° C. and the mole ratio is 1.1.

18. The method of claim 12, wherein the diamines are selected from the group consisting of diamines of α,ω-diamino alkanes having between about 3 and 20 carbon atoms.

19. The method of claim 12, wherein the diamines are selected from the group consisting of 1,3-diamine propane, 1,4-diamino butane, 1,5-diamine pentane, 1,6-diamine hexane, 1,7-diamine heptane, 1,8-diamine octane, higher α,ω-diamino alkanes and mixtures or combinations thereof.

20. The method of claim 12, wherein the aldehyde is selected from the group consisting of formaldehyde, paraformaldehyde, and mixtures or combinations thereof and wherein the diamines are selected from the group consisting of 1,3-diamine propane, 1,4-diamino butane, 1,5-diamine pentane, 1,6-diamine hexane, 1,7-diamine heptane, 1,8-diamine octane, and mixtures or combinations thereof.

21. The method of claim 12, wherein the aldehyde is selected from the group consisting of aldehyde and aldehyde donors, where the aldehydes have the general formula $R^1CHO$, where $R^1$ is a hydrogen atom, a hydrocarbon group having between 1 and 20 carbon atoms, and mixtures or combinations thereof and when $R^1$ is a hydrocarbon group, then $R^1$ may be linear, branched, cyclic, or any combination thereof.

22. The method of claim 21, wherein the $R^1$ group is selected from the group consisting of a hydrogen atom, alkyl groups, oxyhydrocarbon groups, aryl groups, alkaryl groups, aralkyl groups, and mixtures or combinations thereof and when $R^1$ is a hydrocarbon group, then $R^1$ is linear, branched, cyclic, or any combination thereof.

23. The method of claim 12, wherein the aldehyde is selected from the group consisting of formaldehyde, paraformaldehyde, and mixtures or combinations thereof.

24. The method of claim 1, wherein the composition uptakes at least 10 wt. % sulfur at 25° C. and at least 10 wt. % sulfur at 80° C. and the mole ratio is 1:1.

25. The method of claim 1, wherein the composition uptakes at least 20 wt. % sulfur at 25° C. and at least 20 wt. % sulfur at 80° C. and the mole ratio is 1:1.

26. The method of claim 1, wherein composition uptakes at least 30 wt. % sulfur at 25° C. and at least 30 wt. % sulfur at 80° C. and the mole ratio is 1:1.

27. The method of claim 1, wherein the composition uptakes at least 40 wt. % sulfur at 25° C. and at least 40 wt. % sulfur at 80° C. and the mole ratio is 1:1.

* * * * *